United States Patent [19]

Bieringer et al.

[11] Patent Number: 4,764,015
[45] Date of Patent: Aug. 16, 1988

[54] METHOD AND APPARATUS FOR NON-CONTACT SPATIAL MEASUREMENT

[75] Inventors: Robert J. Bieringer, Toledo; James A. Ringlien, Maumee, both of Ohio

[73] Assignee: Owens-Illinois Television Products Inc., Toledo, Ohio

[21] Appl. No.: 948,365

[22] Filed: Dec. 31, 1986

[51] Int. Cl.$^4$ ............................................. G01B 11/00
[52] U.S. Cl. .................................... 356/372; 356/376
[58] Field of Search ............... 356/372, 375, 376, 384, 356/385, 386, 387; 250/560

[56] References Cited

U.S. PATENT DOCUMENTS 3,901,606  8/1975  Watanabe et al. ................... 356/372
4,115,702  7/1978  Nopper ........................... 356/384 X Primary Examiner—Eugene R. LaRoche
Assistant Examiner—David Mis

[57] ABSTRACT

An electro-optical gauging system for measuring the flatness of an edge of a workpiece which may be closed upon itself and of non-circular form by mounting the piece centered on a flat circular table having radial slots and an open center. A line source of light of uniform intensity is located at the table center to project a line image along a slot as the table is rotated around an axis of rotation perpendicular to its plane and coincident with the line image. The distance along the slot depth dimension from a reference edge in each slot to the workpiece edge is measured by measuring the width of the light beam passed between the reference edge and the workpiece edge. Measurements are made by passing collimated light between the edges to be measured. The light is imaged by a quasi-telecentric system onto a linescan camera having a linear array of pixels extending along the image length. Image-to-camera distance variations are accommodated by the imaging lens system. The effect of the blurring at the ends of the line image is eliminated by electrical signal compensation. A sampling linescan establishes the maximum light intensity level along the length of the line image. A measurement scan measures the line image length as a pixel count for those pixels having an incident light intensity equal to or greater than one-half the maximum level initially sampled.

71 Claims, 5 Drawing Sheets

METHOD AND APPARATUS FOR NON-CONTACT SPATIAL MEASUREMENT

This invention relates to an electro-optical system and mechanism for non-contact measuring and more particularly for measuring the deviation of the contour of an edge of a body from a standard. It is illustrated in detail with respect to the out of flat measurement of the face panel seal edges and the funnel seal edges for cathode ray tubes.

Cathode ray tubes, particularly those employed in television and for computer displays, have a rectangular display surface on a face panel of rectangular form. The manufacture of such tubes is most conveniently achieved with the face panel separable from its mating tube envelope funnel until an advanced state of the process. The partially processed face panel and funnel are sealed together by means of a devitrifiable solder glass which is applied in a bead to the seal edge, usually of the funnel, and fused to that seal edge and the mating seal edge of the face panel in a process which advantageously is accomplished rapidly. Accordingly, the mating funnel and face plate seal edges should closely conform over their entire lengths thereby insuring uniformity of the seal thickness and a high quality seal over that entire length. Flat planar seal edges such as those on the flanges of face panels and the funnels are utilized in many applications and this invention will be disclosed as applied to the measurement of the deviation from flatness of flat planar seal edges.

Flatness of the sealing edges of both panel and funnel are of importance in properly sealing the two during manufacture of a television tube. In the past, the sealing surfaces have been ground flat in order to insure proper seals. The costly grinding operations can be avoided where the seal edge is precisely formed flat from the molten glass state. However, formed seal edges require a degree of mold precision which dictates in-process maintenance of mold figuring and verification of product compliance with specifications for seal edge flatness. It is desirable to monitor one hundred percent of production for seal edge flatness at speeds compatible with the glass part forming processes so that a quantity and precision of data sufficient to permit corrections to be made in mold figuring and to permit verification of the seal edge quality of all product at a reasonable number of in-line inspection stations.

Heretofore, mechanical inspection devices have been utilized to ascertain seal edge flatness. Space and precision limitations have resulted typically in a gauge with sixteen stations around the edge periphery offering readings accurate to plus or minus four to five mils. It is desirable to employ a greater number of gauging stations along the periphery of the ware at a spacing not readily attainable with mechanical sensors. Further, the mechanical sensors tend to hang up and be inoperative or issue false readings.

It is desirable that seal edge flatness be gauged by non-contact means thereby avoiding the limitations of mechanical sensors.

An object of this invention is to improve the accuracy, speed and spatial density of non-contact spatial measurements.

A second object of the present invention is to improve gauging methods and means for contours, particularly such means sensing deviations of a workpiece from a standard contour such as a flat seal edge.

Another object is to provide a rapid series of readings of the deviations of a contour from a standard at closely spaced stations along the contour.

Another object is to avoid reliance upon mechanical motion or contact of sensing elements for sensing contours.

A further object is to reduce the space requirements for individual contour measurements thereby permitting a greater number of measurements in a given space.

An additional object is to accommodate contours having a wide range of positional variations with respect to the sensing elements of a contour gauging system.

In accordance with the above objects, one feature of this invention is a novel optical system in which light in the plane of measurement has its angular content in that plane limited by a slit so that a high degree of measurement precision of the beam width can be achieved at a detector arranged to measure light along the plane. A nearly collimated beam of light produces a shadow of an edge which can have a large range of spacings from the detector and its detecting optical system. That shadow on a first lens is imaged on the detector by a second lens and the angular content of the light arriving at the detector is limited by a baffle having a slit normal to the plane of measurement placed at the back focal plane of the first lens.

A second feature of this invention is to combine the above optical system with an anamorphic system in which the collimated beam is made divergent only in the plane normal to the direction of measurement by a cylindrical lens. The reference and measured edges are positioned to partially interrupt the divergent beam and the shadows of those edges are spaced in the collimated dimension of the beam. The portion of the beam passed between the reference and measured edges is recollimated in the plane normal to the plane of measurement and directed to the detecting optical system.

A third feature of the invention includes a cylindrical lens between the detector and the lens imaged on the detector having positive power only normal to the direction of measurement to focus and to concentrate the parallel light along the measurement direction including the edge shadows on the detector as it moves transverse of the measurement direction.

A further feature involves the definition of the true spacing of the reference and measurement edge shadows at the ends of the light beam in a system subject to optical fringing by scanning the incident beam, ascertaining the magnitude of the scanned signal over a constant or essentially constant signal level region of maximum incident light between regions of gradual increase and decrease of signal level and setting the spacing measurement limits at one-half the magnitude of the constant region.

An additional feature of this invention is the use of a collimated radiant energy beam and a linescan camera to measure a transverse dimension of the beam and particularly the beam defined by shadows of the edges of elements which are the limits of the gap between a seal edge of a workpiece and a reference mask edge which is fixed with respect to a support for the workpiece. The workpiece is mounted on a support surface having a general contour conforming to the edge contour to be gauged, a planar surface in the example. The support surface is slotted and a reference element is mounted to precisely define the bottom of the slot. A beam of light is passed through the slots to a light reader, the detector or linescan camera, which senses the space between the shadows of the reference surface of the slot bottom and the edge of the workpiece on the support. Relative motion is imparted between the light source-light reader and the support workpiece so that a series of slots are read as to their respective reference surface-workpiece spacing.

An advantageous arrangement for gauging an edge, particularly an edge closed upon itself is to maintain the light source-light reader system stationary with one element of that system at the center of rotation of a rotatable support and to rotate the support in its plane, in the case of a planar support table, with the workpiece so that radial slots from the center of rotation to the periphery of the support are passed through the optical path of the light source-light reader system. In the example a rotatable support for the workpiece having the edge to be gauged is arranged to receive that edge with the workpiece centered on the axis of rotation of the support. A line of light of uniform brightness and intensity is collimated from a source along the axis of rotation and directed radially perpendicular to the plane of the support to a one linescan solid-state camera. The support is radially slotted in sectors extending from the axis of rotation and a mask for light projected along the slots is positioned a given distance from the support surface for the edge to be gauged. With the edge on the support surfce, the distance between the edge and mask is measured electro-optically for each slot. In the disclosed arrangement, the support is arranged to rotate through at least one full revolution. The radial slots in the support are equally spaced through 360° so that measurements are made around the entire periphery of a seal edge closed upon itself.

A face plate or funnel seal edge mounted on the support will have its position established by the three highest points which are not in a straight line as the points engaging the support. The mask edge is present in each slot bottom as viewed by the linescan camera. A correction for any deviation from a flat reference plane of any of the mask edges is calibrated out of the gauge readings by measuring the gap to a flat calibration element and memorizing electrically the electro-optical signal representing the gap distance between the mask edge and the calibration element for each slot so that it can be subtracted from the measured gap for each slot in a gauging operation as the tare or offset value for each slot.

Rectangular face plate and funnel seal edges, when rotated with the support, present a seal edge-to-detector spacing along the optical axis of the system which varies significantly. In the case of a conventional twenty-seven inch diagonal rectangular television tube, the seal edge optical image must maintain adequate focus for measurement through a range of nearly six inches along the object-camera axis. Variations of the imaged edge distance from the camera and the deviations from best focus resulting in blurring and changed magnification are overcome with a quasi-telecentric imaging system which separates these effects and makes the magnification changes vanishingly small. The blurring resulting from convolution of an edge with a rectangular impulse response is overcome by measuring the position of the half intensity point of the maximum light intensity along the dimension of measurement. Thus, the measurement of the full width of the gap signal at its half intensity point yields the accurate gap width essentially independent of the object-camera distance. Electronic hardware provides this measurement when set at a threshold for measurement scan video based upon the maximum signal obtained in the preceding scan of the slot and by counting the number of camera pixels between the half maximum light intensity edges as a binary video signal.

The exemplary seal edge gauging system includes optical sensing control means including phase adjustable detecting means for activating the camera reading of a slot as it passes through the optical path of the system. A support table rotation control positions the table in a start position and controls acceleration and deceleration of the rotating table with speed and rotational position sensors while identifying the slot which is in the gap width reading position. Rotational speeds for a gauging system are correlated with camera linescan and computing speeds to enable and to assure that all functions are performed consistently. In a single rotation gauging mode with a generally symmetrical rotational velocity pattern, the maximum table velocity occurs at coincidence of the half gauging cycle station with the optical path and the slot detection, camera scan, signal storage functions for the slot at that point must produce at least two full scans for a slot width signal reading.

Control logic, in addition to calculating, displaying and recording a scaled value of deviation from the optimum contour is arranged to identify those locations along the workpiece which have the maximum deviation from optimum, in a CRT element seal edge the locations which are out of flat the maximum. Stability of the system can be checked from time to time by recording the gauging station values for a workpiece master and remeasuring and comparing the remeasured values against the recorded values as a check. The logic can also classify the workpieces as to their deviation.

DR

The above and additional objects and features will be understood more fully from the following detailed description when read with reference to the accompanying drawings in which.

Figure 1:
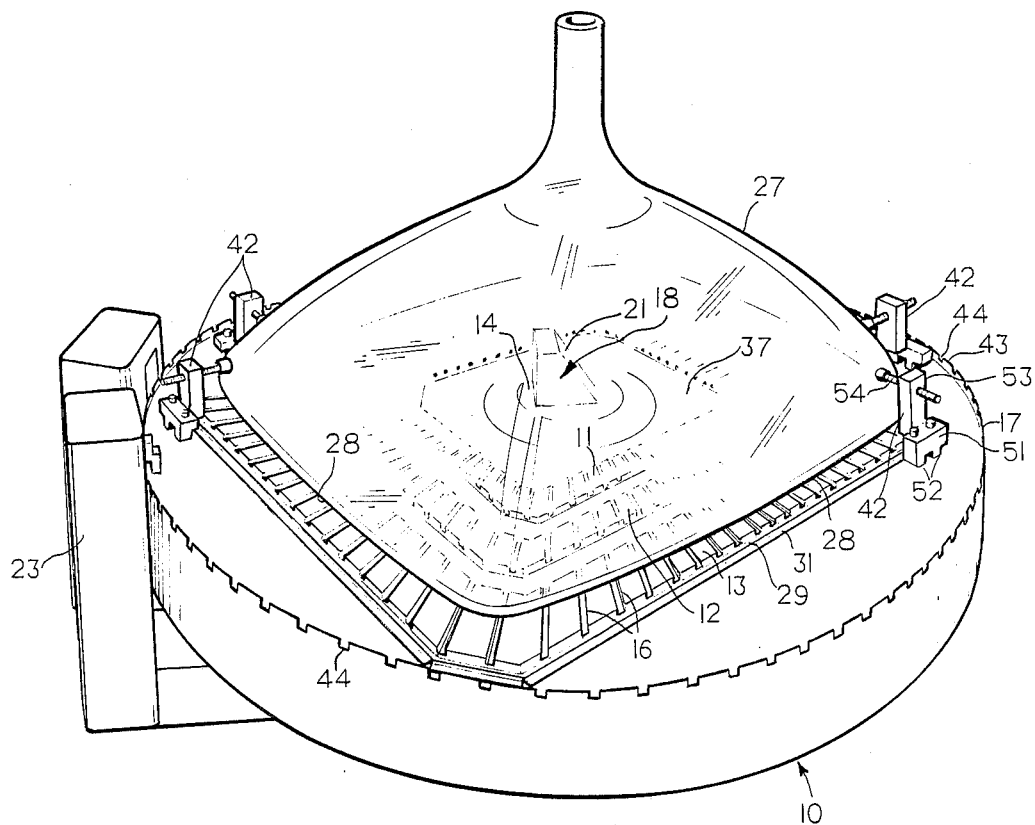
FIG. 1 is a perspective view of an apparatus for measurement of the out of flat deviations of a seal edge according to this invention with a rectangular television tube funnel positioned for edge gauging.

The invention is illustrated as a rotational out of flat gauge which electro-optically measures the gap between a flat surface and the seal edge of a television tube face plate or funnel. A minimum gap is desired in order that the seal edges of the face plate and funnel closely match and only a small quantity of solder glass will be required in bonding the face plate to the funnel. The gap is measured at a number of regions around the seal edge as a distance between the edge and a reference mask in a groove adjacent a segment of the flat support surface utilizing a light beam and thereby effecting a non contact measurement.

The apparatus for such measurements is a rotatable round table 10 having a flat support face for various sizes of funnels and face plates made up of rectangular support surfaces 11, 12 and 13 which are very flat. For example, support surface 11 is of dimensions to support the seal edge of thirteen and fifteen inch tube components, support surface 12 is of dimensions to support the seal edges of nineteen and twenty-one inch tube components, and support surface 13 will suport the seal edges of twenty-five and twenty-seven inch tube components. A light projection path for a light beam emanating from the table center 14 is provided at regular intervals across the support surfaces 11, 12 and 13 as pie shaped radial grooves 16 extending continuously through the support surfaces and the material underlying those support surfaces from center 14 to the table circumferential perimeter 17. The light projection system 18 comprises a light source assembly 19 which includes a stationary mirror 21 mounted in the center of the table to direct or rotate a beam of light 22 from the central axis of the table to a radial path generally in the body of the table immediately below the support surfaces and extending beyond the perimeter 17 along grooves 16 and the region slightly above the support surfaces 11, 12 and 13 to a detector assembly 23 having a stationary mirror 24 mounted beyond the table perimeter to direct or rotate the beam 22 to a path normal to the table support surfaces.

Table 10 is arranged for rotation around a central axis perpendicular to the plane of the table on a suitable base structure (not shown) having support bearings and a drive means (not shown) including a motor 26. It thus, in a single revolution of the table, carries each of the plurality of grooves 16 through the light beam 22. With a seal edge of a piece of ware such as funnel 27, shown in FIG. 1, mounted on table 10 a true flat seal edge would, if all mask edges are of uniform height relative to the support surface for the seal edge, result in light on the detector assembly 23 which would produce an indication of a uniform gap between the seal edge 28 of the funnel and the beam occluding edge 29 of the mask element 31. As will be described below the gap dimension will be sensed electrooptically as a signal width or a binary count which can be scaled to an absolute measurement or compared to offset values for deviation from flatness of the seal edge under test.

Figure 3:
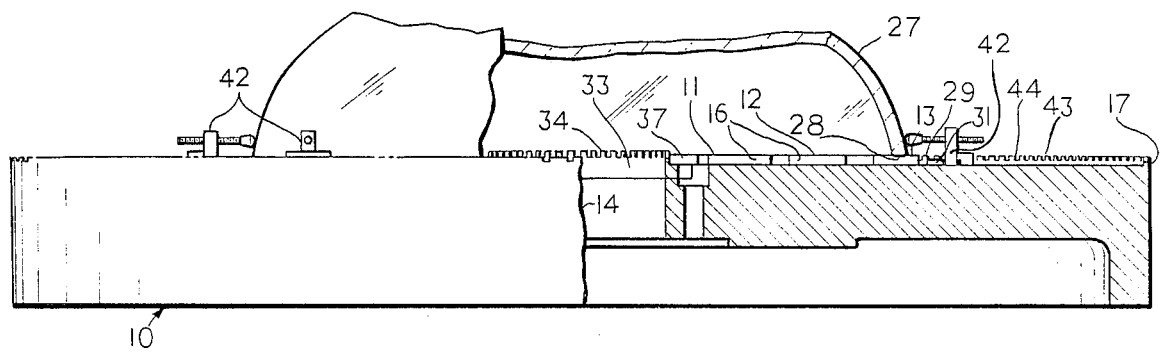
FIG. 3 is a side elevation, partially sectioned, of the ware support and gauging table of FIG. 2 taken along the line 3—3 of FIG. 2.
Figure 2:
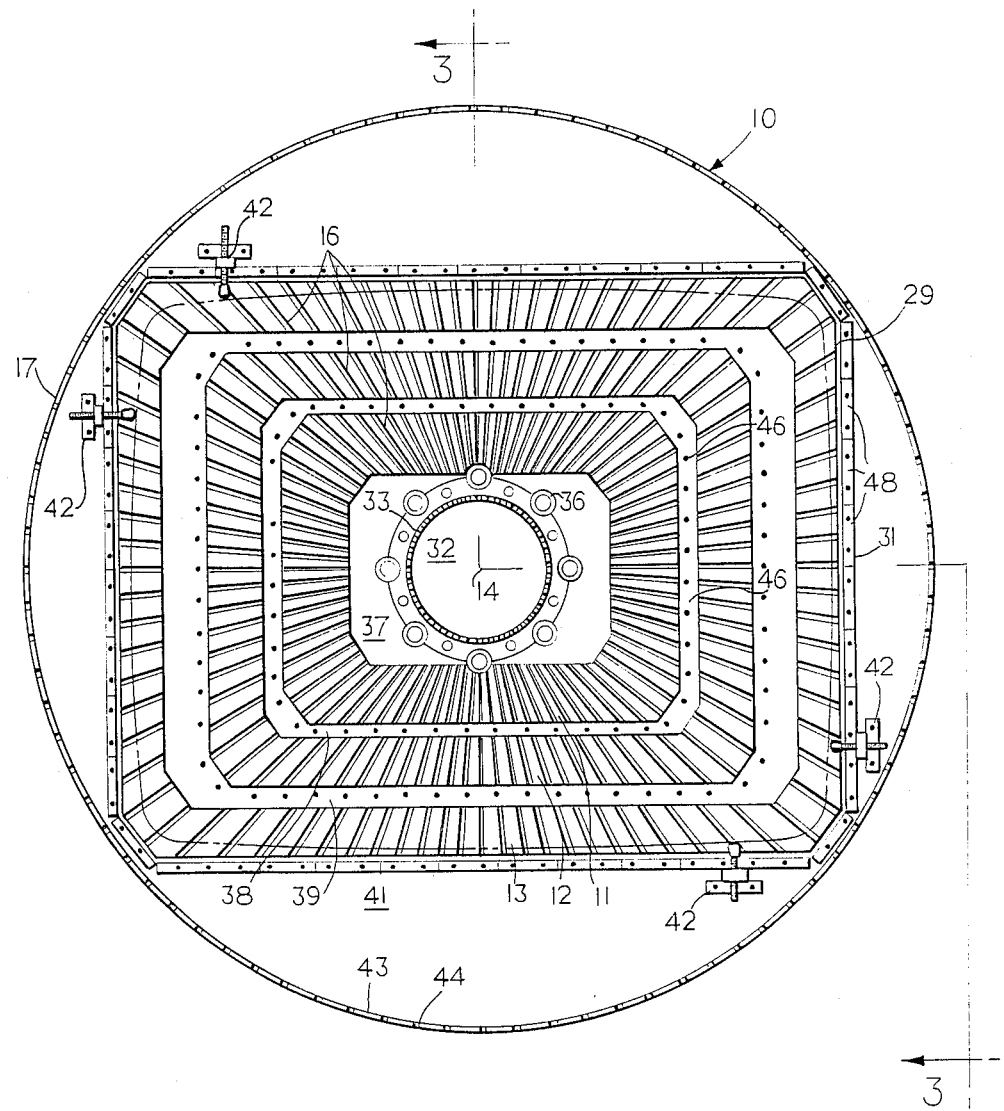
FIG. 2 is a plan view of a ware support and gauging table as shown in FIG. 1.
Figure 4:
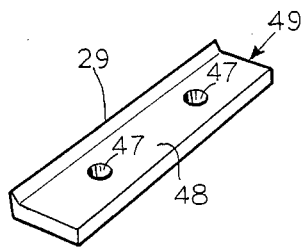
FIG. 4 is a perspective of a reference mask element for the gauging mechanism.

As best seen in FIGS. 2 and 3, table 10, has a circular central opening 32 in which is mounted the light source assembly 19. A notched fence 33 borders opening 32 to mask light from source 19. Fence 33 has notches 34 in radial alignment with the ray like radial grooves 16 to permit the passage of light beam 22 from a line appearing at the table axis of rotation on mirror 21 along grooves 16 as the table rotates those grooves into alignment therewith and to mask the light beam from the table and seal edge when the table motion positions the grooves out of alignment with the beam. Concentric with fence 33 is a circular array of fasteners 36 for a mounting plate (not shown) on which table 10 is mounted for rotation. A cut away region 37 lies between fence 33 and the first support surface 11. Between support surfaces 11 and 12 and 12 and 13 are cut away regions 38 and 39 which provide seating surfaces for sections 49 of mask element 31 as shown in FIG. 4. Similarly a seating surface 41 is cut below the support surfaces outside of surface 13 and at the perimeter of that surface to mount sections of mask element 31 and mount brackets 42 for centering and/or holding down the ware on the support surfaces. The outer perimeter of table 11 has a raised fence 43 which masks light from detector assembly 23 and has notches 44 radially aligned with grooves 16 to pass light beam 22 from the grooves to the detector assembly when the table is rotated to align the grooves with the beam.

As shown in FIG. 2, tapped holes 46 are provided in table surfaces 38, 39 and 41 to receive suitable screws which pass through holes 47 in the foot 48 of section 49 of mask element 31. These sections 49 are adapted to be positioned at the outer end of each groove 16 in the support surface 11, 12, or 13 whichever is supporting workpieces, to locate their masking edge 29 at a height which ideally, for a flat contour seal edge, is in a plane with all other edges which is parallel to the cooperating coplanar support surface 11, 12 or 13. Thus, as illustrated in FIG. 1, when large funnel seal edges are to be gauged by mounting them on surface 13, mask sections 49 are secured adjacent the outer perimeter of surface 13 as a continuous mask element 31 defining the reference from which the gap normal to the table surface to the seal edge 28 is measured.

In order to minimize parallax between masking edge 29 and the seal edge 28 to be gauged, it is desirable to mount the mask edge 29 as close to the seal edge as is convenient. In the example when a twenty-five or twenty-seven inch CRT face plate or funnel seal edge is to be gauged, it is mounted on surface 13 and the mask elements 31 sections 49 are secured on surface 41. Similarly, a nineteen to twenty-three inch CRT part is mounted on surface 12 and the mask element 31 is secured on surface 39 while smaller tube parts mounted on surface 11 are gauged with mask element 31 secured on surface 38.

While the weight of a funnel or face plate is sufficient to maintain a piece of ware placed on support surfaces 11, 12 or 13 during rotation of the ware, it is advantageous to provide mounting brackets 42 to center and hold the ware, particularly ware of the larger dimensions. Such brackets are shown at diagonally opposed corners in FIG. 1 and each comprise a base 51 on legs 52 supporting it clear of the light path from any grooves 16 with which they are aligned. An upstanding post 53 from base 51 supports a screw mounted bearing element 54 adjustably to enable the element to locate and maintain the ware in proper positions by abutting its outer wall.

A servo motor 26 drives table 10 smoothly through a single revolution to gauge the flatness of a seal edge. The motor 26 is part of a position control loop including a tachometer 56, an encoder 57, a motor loop controller 58 and a power amplifier 59. The pattern of the table motion is produced by a position reference generator 61 in response to a START signal from operator's panel 67. Table position in synchronized with the optical gauging so that gap measurements are identified with the individual grooves 16 as they traverse the region of alignment with light beam 22. Computer assembly 62 integrates camera interface and logic 63 operation with the position reference generator 61 as the position reference generator executes a table revolution so that when all groove gap measurements have been received from the camera interface and logic assembly 63 as trains of pulses from a linescan camera 122 representing for each groove the spacing normal to the supporting surface between the mask in the groove and the seal edge, the computer 62 applies the stored offset values for each groove against the pulse train produced signal for that groove and calculates the actual gaps between the seal edge 28 and the plane of support surface 11, 12 or 13, as the case may be. The results for all groove gap calculations can be displayed on the cathode ray tube (CRT) 64. They also can be outputted to channel 66 to a gauge computer (not shown) and compared to a set of limits for each groove for classifying the seal edge by maximum gap size.

Slot identification and slot transverse dimension measurement are correlated through the camera interface and logic 63 which receives signals from slot detector 55 and the linear array of pixels of linescan camera 122. The linear array of pixels is scanned repetitively and continuously during a gauging operation but its signals are enabled for reading in the camera interface and logic 63 only as a table slot 16 or gauging station is passed through the optical path of the system. Slot detector 55 provides the enabling signal. Slot identification is also derived from slot detector as a count of slots detected from the START position of the table 10. In the example, the slot count is reset to zero upon the completion of a gauging operation and the setting of the table at its START position so that it counts slots from one to eighty-four and identifies the slot number with the camera a pixel count for the transverse dimension of that slot in the camera interface and logic 63 for each slot in succession through the gauging cycle.

Power amplifier 59 is pulse width-modulated to form a torque or current loop with the permanent magnet dc servo motor 26 which follows the torque command produced by the motor loop controller 58. The motor loop controller 58 forms both a velocity loop using the speed signal from the dc tachometer 56 mounted on the motor 26, and a position loop using the position signal of the position reference generator 61 and the pulses from the 1000-line incremental encoder 57 that is also coupled to the motor shaft.

The table start position locates the table rotational position relative to the optical path between the first and last slot or gauging station. Motor 26 is geared to the table 10 so that an integer number of motor and encoder revolutions occur for each table revolution. Logic in the motor loop controller 58 counts down pulses from encoder 57 against a total pulse count for the motor pattern in the position pattern loop control. Motor loop controller 58 also sets the table to its start position by issuing a slow speed advance or retard signal to the motor in response to a position sensor 60. Sensor 60 is a vane positioned on the underside of table 10 and moveable into the range of influence of two spaced proximity sensors which provide a start position signal when the table positions the vane in the range of influence of both sensors and an advance or retard signal driving the table toward the start position when only one of the proximity sensors is in the range of influence. If table misalignment from the start position at the end of a gauging cycle or on start up is so great as to locate the vane out of the range of influence of both proximity sensors, motor loop controller issues a slow speed signal to drive the table into the range of influence of the proximity sensors so that final home positioning is achieved under their control.

Figure 9:
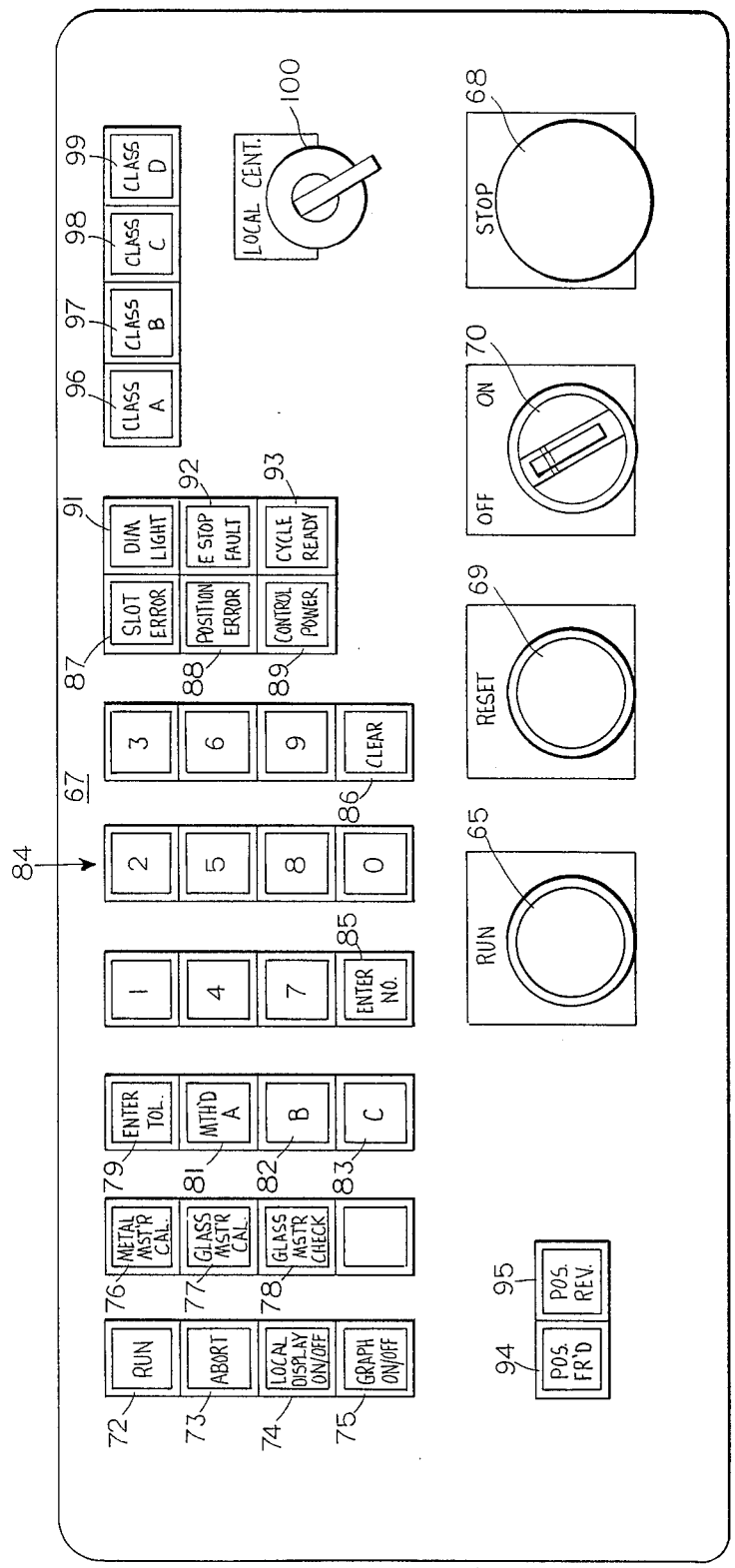
FIG. 9 is a plan view of the control panel for the system illustrating the several actuators and indicators present at the panel.

An operator's panel 67 is provided with controls and indicators including run switch 65, stop switch 68, reset switch 69, and on/off switch 70 as well as other switches and indicators to be discussed with reference to FIG. 9 showing details of the panel face. The position reference generator 61 holds a program that generates the table motion position commands for the motor loop controller 58, responding to the RUN and STOP switch actuators 65 and 68 and table positioning sensors 60 which cause the table to move to its START position. The positioning sensors are proximity sensors for actuating a forward or reverse motion toward the starting position at a low speed and, when both proximity sensors have active outputs, indicating that the table is in the correct starting position, they cause the table to be stopped at that START position. Normally, the table will come to rest at the starting position so that no correction is needed. The RUN switch is enabled when the table 10 is in the correct starting position to cause the position reference generator 61 to respond and actuate a single pattern controlled revolution of table 10. Upon completion of the table revolution, there is a delay to enable the gap gauging functions to be completed and then a READY indicator 71 is actuated to signal the system is conditioned for another gauging operation.

The control for operator's panel 67 is shown in detail in FIG. 9 as including an array of switches and indicators for inputting signals to the system and displaying system conditions. Switch actuators include a RUN switch 72 for setting the gauging mode of operation, an ABORT switch 73, a LOCAL DISPLAY switch for activating displays on CRT 64 augmented by a GRAPHIC DISPLAY switch 75. Operating mode selector switch actuators include a METAL MASTER CALIBRATION switch 76, a GLASS MASTER CALIBRATION switch 77, a GLASS MASTER CHECK switch 78, an ENTER TOLERANCE switch 79, TOLERANCE METHOD switches 81, 82 and 83 for methods A, B and C to be discussed. A number switch pad 84 with an ENTER switch 85 and a CLEAR switch 86 is provided to enable slot numbers, ware identification, tolerance values and the like to be inputted to the system. Indicators include one for SLOT ERROR 87, POSITION ERROR 88, CONTROL POWER 89, DIM LIGHT 91, EMERGENCY STOP 92, and CYCLE READY 93. A misalignment of the table with the start position is indicated by a POSITION FORWARD lamp 94 and a POSITION REVERSE lamp 95. Ware classification is indicated as four classes, A, B, C and D on indicators 96, 97, 98 and 99. Connection of the system to a plant computer is accomplished by switch 100.

Figure 5:
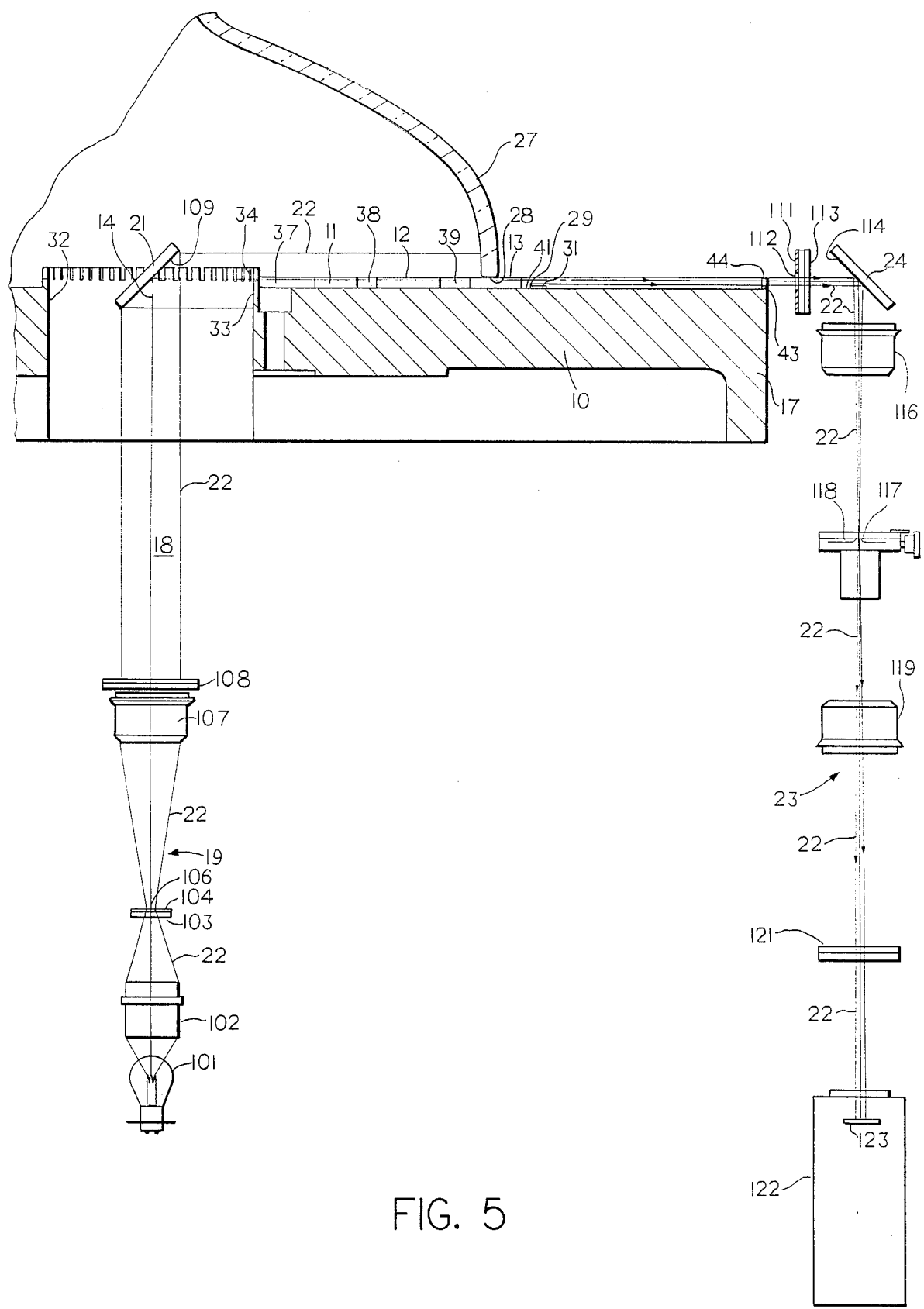
FIG. 5 is a sectioned, partially schematic view of the optical system employed in the gauging mechanism of FIG. 1 showing its relationship to the support table and supported tube funnel.

The stationary light source assembly 19 mounted at the center 14 of the rotatable table 10 is shown schematically in FIG. 5. It projects a beam of light through each of the grooves 16 in turn as the table is rotated. Light passing through the grooves 16 is blocked above by the seal edge 28 being gauged, and blocked below by the masking edges 29 mounted on the adjacent cut away region 38, 39 or 41 of the table 10, as the case may be, so that as the grooves pass through beam 22, the light patterns reaching the detector assembly 23 are modified both by the heights of the seal edge and those of the mask edges. The camera interface and logic circuit 63 is signaled each time a groove moves into proper alignment with light beam 22 by the slot detector 55 which can be made responsive to the passage of notches 44 in table outer fence 43 as by being positioned a suitable increment in advance of beam 22 around the circumference of the table. The slot detector 55 can be a proximity switch or a slotted optical switch and can be mounted so that its phase relationship to the gauging optical path can be adjusted by shifting the switch along the path of the outer fence 43. For each slot, the camera interface and logic circuit 63 generates a corresponding height measurement which is passed to the computer assembly 62 and processed to a gap width or a deviation from a tare signal for the gap at that slot to indicate deviations of the seal edge from flat. Thus by the time the table 10 has completed a revolution, the computer assembly 62 has stored a height measurement fo each groove.

In view of the rectangular form of the funnel or face plate whose seal edge is to be gauged, the relative position of the detector 23 and the seal edge 28 vary as the table is rotated from a minimum separation as the corners of the workpiece are aligned with the light beam 22 to a maximum separation as the sides parallel to the major axis of the rectangle are presented to the beam. Thus, for a twenty-seven inch funnel or face plate the optical system must maintain sufficient focus through a range of nearly six inches along the object-detector axis. This places severe requirements upon the depth of field of the optical system. Further the system must also be insensitive to optical coherence effects such as diffraction and interference if a sharp edge definition at the gap limit is to be defined by the detector.

In a conventional imaging system two forms of degradation of the image occur when the object-detector distance varies from that of best focus. One is a blurring or broadening of an imaged edge and the other is a change in magnification. These two effects are normally inseparable. The blurring and magnification effects are separated and the magnification changes are made vanishingly small by use of a quasi-telecentric imaging system. Since the blurring results from convolution of an edge with a rectangular impulse response, its location as measured by the position of the half intensity point is not changed by moderate defocus. An algebraic analysis with reference to FIG. 6 supports this.

Figure 6:
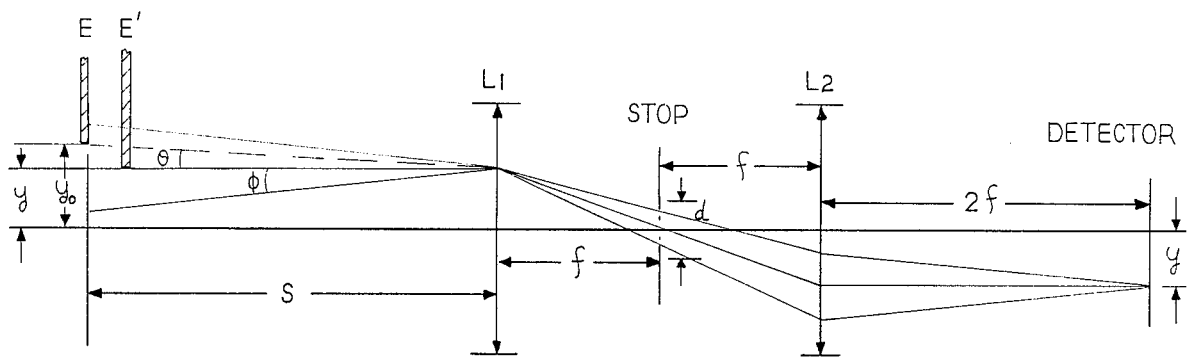
FIG. 6 is an optical diagram of the quasi-telecentric system employed to provide a depth of focus accommodating the range of locations of the seal edge being gauged relative to the detector.
Figure 8:
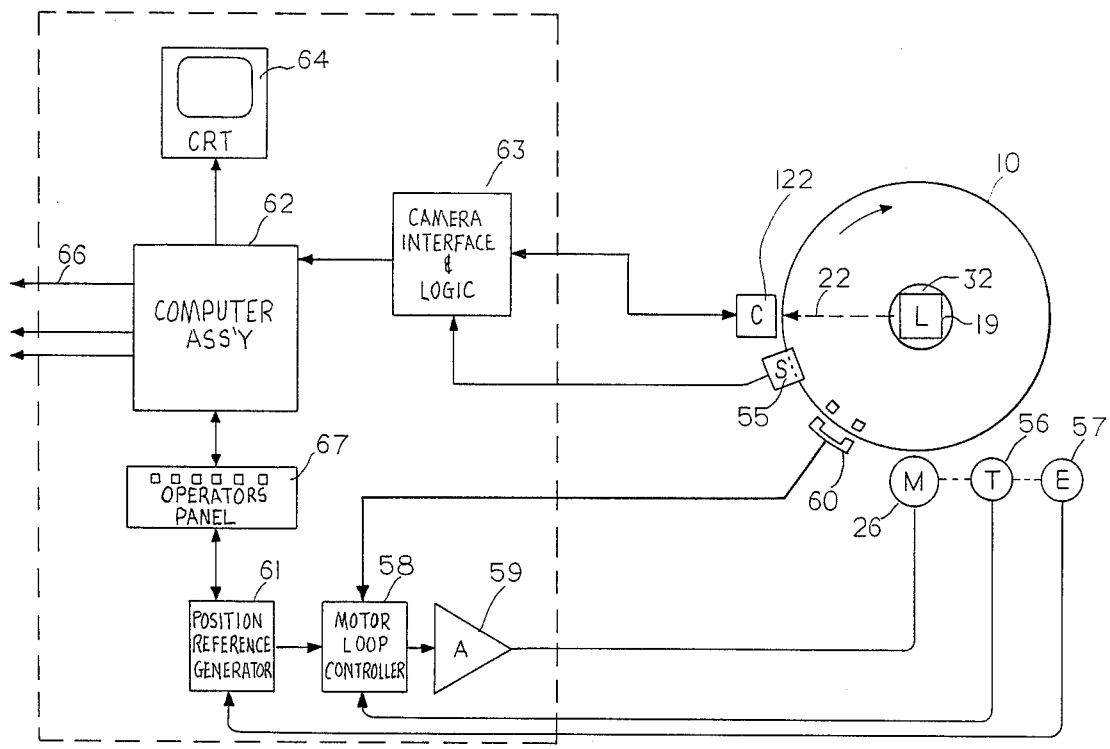
FIG. 8 is a block diagram of the electrical system of the gauging apparatus of FIG. 1.

FIG. 6 is a schematic representation of an optical train for a system having unit magnification in which the object, the seal edge subject to gauging in the present apparatus, is at a variable distance S from the input lens $L_1$ which is imaged onto the detector by the lens $L_2$. Centered between the two lenses of focal length f and located at the back focal plane of the input lens L, is an ajustable aperture stop. Since the detector, a linescan camera, lies in the plane of the figure, the stop need not be circular and a baffle having an adjustable slit with its long axis perpendicular to the plane of the figure will function. The width of the stop determines the size of the beam cone angle $2\phi$. E and E' represent two positions of an edge, both at distance S from the first lens $L_1$, even though E' is shown closer to $L_1$, for purposes of illustration. Motion of the edge E results in occlusion of a portion of the light cone, represented by the angle $\theta$, causing a variation in the magnitude of the light flux I reaching the position y on the detector. Thus as viewed in FIG. 6:

$$\tan \phi = \frac{d}{2f}\ ;\ \tan \theta = (y_o - y)/S.$$

For the condition $y \leq y_o - S \tan \phi$ $$R(y) = \frac{I(y)}{I(O)} = 1.$$

For the condition $y \geq y_o - S \tan \phi$ $$R(y) = \frac{[\theta(y) + \phi]}{2\theta} = \frac{\arctan((y_o - y)/S) + \arctan(d/2f)}{2 \arctan \frac{(d)}{(2f)}}$$

$$R(y) = \tfrac{1}{2} [1 + \arctan((y_o - y)/S)/\arctan(d/2f)].$$

If we consider the width of the sensed half intensity level of light flux when $$R(y_{\tfrac{1}{2}}) = \tfrac{1}{2}$$

$$\arctan [(y_o - y)/S] = 0$$

since $y_o/S << 1$ and $\frac{d}{2f} \neq 0$ therefore $y_{\tfrac{1}{2}} = y_o$, independent of S!

In order that this result hold, conditions must be:

$$y_o \geq \frac{Sd}{2f}$$

$$\text{or } d \leq \frac{2fy_o}{S}.$$

For example
 f=4 inches,
 $y_o$=0.05 inch
 $S_{max}$=8 inches
 d≤$y_o$=0.05 inch.

Therefore by measuring width at one half maximum light intensity a true value of beam width representing gap width will be indicated and a perfectly collimated input beam is not required. This is done by translating light intensity to an electrical signal or voltage level against position across the beam derived from a linescan camera scanning across the light passed through the gap width, measuring maximum intensity for a sampling signal representing a given gap to be measured, establishing the half maximum intensity for that gap as a threshold level, and measuring the length along the scanning axis of a measurement signal at or above half maximum light intensity following the sampling signal.

Figure 7:
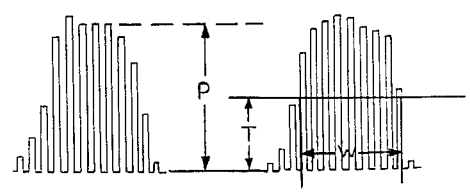
FIG. 7 is a plot of the video voltage versus time for a scan signal derived from the detector showing peak measurement P and width measurement W representative of linescan camera pixel count and thus the gap between the mask and the seal edge.

The signal depicted in FIG. 7 is made up of signals from individual pixels which are irradiated by the transmitted portion of the light beam. Ideally, with a uniform light intensity across the width of the beam the pixels contributing the leading and trailing edges of the signal would receive light intensities which increase to a maximum value toward the central portion of the image where the full cone of light falls on the pixels as ramps, and across the central portion between those ramps are light intensity and resultant pixel signal levels should be uniform. However, this may not be the case due to system variables hence the maximum value of the signal, which is an envelope of the individual pixel signal levels, is developed as an average peak signal level of value P in FIG. 7 in the sampling cycle of the camera scan. The length of the transverse dimension W as measured for signal values exceeding the threshold signal level T of FIG. 7, set at a value of one half P, is measured as a count of the number of pixels having signal levels above threshold T.

From the results of the above calculation, it is clear that measurement of the full-width of the image of the gap at its one half intensity points yields the proper gap essentially independent of object distance S. Measurement of the width of the gap at its one half intensity point can be done electronically by setting a threshold for the measurement scan video signal based upon the maximum signal obtained in the previous scan and counting the number of camera pixels between edges of the binarized video. Thus the maximum rotational velocity of the table 10 must permit two camera scans while full light flux is in the slot so that a sampling signal amplitude P for the camera signal envelope can be measured and its half value T employed to establish the amplitude level of the next following camera signal measurement envelope at which the width W of that envelope will be measured to establish the height of the beam passed by the slot.

FIG. 5 schematically represents the optical system of this gauging system wherein the stationary light source assembly 19 is positioned with its optical axis on the axis of rotation of the gauging table 10. The source 19 is arranged to provide a band of light of uniform brightness and intensity at the center of rotation 14 of table 10 and perpendicular to the table support surfaces. That band of light is divergent from the center 14 sufficiently to fill the sector between center 14 and the input to the detector 23 and all positions of that slot as its outer peripheral end traverses the input window to the detector 23. A lamp 101 provides a source of light which is passed through a condenser lens assembly 102 to a ground glass diffuser 103 backed by a plate 104 providing an illuminated aperture 106 in the form of a slit having its length in the plane of FIG. 5. The diffuse light from aperture 106 which is of uniform brightness and intensity is collimated by a collimating lens 107, and the beam is passed through an anamorphic lens system including a cylindrical lens 108 having its axis on the optical axis of the light source assembly. The light is convergent about axes lying in the plane of the drawing and remains collimated in the direction perpendicular to those axes and travels to the front surface of a mirror 109 inclined 45° to the optical axis and placed so that the beam center is incident on this mirror at the focal length of lens 108 from lens 108. This produces a pie-shaped beam of light which front surface mirror 109 rotates ninety degrees in order to be parallel to the plane of the table and which diverges from the mirror and fills the slots as they are brought into alignment with the beam reflected from mirror 109. This beam is thus of uniform intensity and divergent in planes parallel to the plane of the table and perpendicular to the gap to be measured between mask edge 29 and the seal edge 28 to be gauged.

The beam of light from mirror 109 passes through notches 34 in masking baffle 33 which are each aligned with a slot 16 and are successively brought into alignment with the beam as the table is rotated through a complete revolution.

The width of the beam normal to the plane of the table as viewed in FIG. 5 beyond the circumference of gauging table 10 represents gap width. This beam after passing between funnel seal edge 28 and mask edge 29 is passed through the aligned notch 44 in light masking outer baffle 43 on the circumference of gauging table 10. A plate 111 having an aperture 112 which is of the width over which a slot can be optically monitored without overlap with an adjacent slot is centered on the optical system to the detector assembly and is of a height exceeding the gap range to be monitored. The function of masking plate 111 and aperture 112 is to assure that the detector sees only one slot at a time. The light beam passing through aperture 112 is recollimated in the plane perpendicular to the drawing by a cylindrical lens 113 having an axis intersecting the optical axis and lying in the plane of the drawing and functioning as another anamorphic system element. Lens 113 is spaced its focal length from mirror 21 measured along the optical axis.

From cylindrical lens 113 the recollimated beam is directed to a flat front surface mirror 114 which rotates the beam ninety degrees to alignment with the axis of the detector assembly 23. This conserves space at the side of the table without deterioration of the beam and edge shadows. The beam thus is projected downward along the side of table 10 through the detector lens assembly 23 through converging lens 116, a binocular optical microscope objective in the example, which is the input lens. The nearly collimated beam of light produces a shadow of the edges of the mask and workpiece on lens 116 which is imaged on the detector 122 by lens 119 and the angular content of the light arriving at the detector is limited to rays which are parallel or almost parallel by adjustable slit 117 in aperture plate 118 at the back focal plane of lens 116. The width of the slit determines the amount of angular deviation from parallel which will pass as in the exemplary quasi-telecentric system discussed in regard to FIG. 6. The beam then passes through a cylindrical lens 121 having positive power only in the planes of slot motion, perpendicular to the direction along which the gap is to be measured, an enchancement not shown in FIG. 6. This lens 121 has its axis on the optical axis of detector lens assembly 23 and spaced its focal length from the detector so that it focuses and concentrates the beam onto the detector in planes normal to the length measurement during more than the slot physical width in order to enhance the opportunity for a plurality of optical scans of incident beam width for each slot during a revolution of the table. Thus, the detector element at each of its pixel positions receives light from the entire width of the gap for all positions of the gap within the input pupil of the system.

Linescan camera 122 is the system detector and provides a line of photodiodes 123 as pixels in the system. Typically a Fairchild Model 1300R camera having a linear array 123 of one thousand twenty four pixels aligned along the plane of the projection of the gap to be measured is employed so that a count of the number of pixels irradiated by the beam is a measure of the slot width when adjusted to respond to only those pixels subject to a light flux intensity at least half the maximum light intensity.

Thus the stationary optical system condenses light from a non point source 101 to a diffuser 103 and through an aperture 106 to a collimating lens assembly 107. That collimated light beam cross section is perpendicular to the plane of FIG. 5 and is of a generally rectangular form having a major axis in the plane of FIG. 5. It is made convergent in that plane by cylindrical lens 108 so that, when reflected at mirror 21, the beam cross section approaches a line which has a major axis normal to the flat surface of the support table 10 of a height substantially greater than any gap within the gauging range of the apparatus. It is masked partially as it passes from mirror 219 by baffle 33 and passed through notches 34 and the aligned slots 16. A portion of the beam above the support table 10 encounters the lip of funnel 27 adjacent seal edge 28 and is occluded from the remainder of the optical system. That light below the seal edge 28 passes along slots 16 and its lower portion is occluded by mask element 31 so that only the beam portion above mask edge 29 and below seal edge 28 passes through slot 16 to the peripheral portions of table 10 and through baffle 43 at notches 44. Beyond the table the light beam is masked to restrict light passing to the stationary detector assembly to that emanating from a single slot as slots are traversed through the sector irradiated by the beam by a stationary aperture plate 111 in which the aperture extends along the table circumference a distance less than the radial projection of the sum of a slot width and the spacing to a next adjacent slot and is of a height exceeding the radial projection of the maximum gap from mask edge 29 to seal edge 28 to be gauged. A cylindrical lens 113 collimates the divergent beam in the plane normal to FIG. 5. Beam 22 is rotated ninety degrees by mirror 114 and directed into converging lens 116 which with adjustable aperture 117 and collimating lens 119 forms a quasi-telecentric system which passes only light parallel or essentially parallel to the optic axis. The beam passed by the slot from lens 119 concentrated and focused on detector linear array 123 by a cylindrical lens 121 having positive power only in the plane of the slot motion, that is perpendicular to the gap measurement, so that it images the light passing through the gap prior to and subsequent to registry of the slot projection with the optic axis as limited by the aperture 112.

The linear array 123 generates a signal of light intensity versus position along the array as represented in FIG. 7 based upon the flux incident on pixels of the array modified by a sample and hold circuit which provides an envelope signal as shown. This video signal represents the gap dimension and is transmitted to the camera interface and logic assembly 63. The linescan camera divides a height including and extending beyond the mask edge-to-seal edge height into one thousand twenty four elements each of which corresponds to five ten thousandths of an inch in the example. It scans the incident beam at a rate of about eight hundred times a second so that on each scan the gap height is measured by the number of camera elements or pixels in the region of the incident beam above the half intensity level as noted above. The sloped leading and trailing portions of the video signal represent optical distortion or blurring of the shadows of the workpiece edge and mask with the true position of those edges represented by the half maximum intensity reference value where a maximum intensity is free of the optical distortion. Thus the sloped signal portions are accommodated in the gap height measurement by establishing maximum intensity for each slot in a first sampling scan, the value P in FIG. 7, halving that level to the value T and measuring the width W as a count of pixels issuing signals representing at least a half maximum intensity light.

The camera is scanned continuously. At each slot edge entry into the sector optical measurement sensitivity, the slot detector 55, when properly phased with respect to the optical system, signals the camera interface and logic assembly 63 to perform a measurement using the next two full camera scans. Proper phasing of detector 55 is by its circumferential adjustment along table rim 43 so that its proximity detection means ideally senses the rotated orientation of the table as it introduces a slot into a relationship with the optical system whereby the slot receives full intensity light flux from the system. Because of the variation in the table speed during the measurement cycle, the phase adjustment must be a compromise where high speed operation is desired. At maximum speeds of rotation, occurring at about the half revolution point, it is desirable to enable a sampling and gauging scan while the maximum light intensity is present. This dictates a slot detector phasing to enable sampling somewhat in advance of the position where the slot and light beam are exactly aligned. Thus for slow speeds of rotation at the beginning and end of the cycle the slot detector enables sampling before maximum light intensity is imposed resulting in somewhat lower peak signal values and thus a setting of a somewhat lower threshold for the early and late gauging scans in a gauging cycle. It has been found that an effective compromise is that which gives the greatest stability or repeatability of values and that at those settings gap variations can be read to 0.0005 inch. During a portion of the peak of the first of these two scans, a low pass RC filter is connected to the video waveform. At the end of this sampling interval the voltage on the filter capacitor is saved. This value is scaled to the peak P of FIG. 7. A suitable fraction of this voltage is used as the threshold T for measuring the waveform width W in the next succeeding scan as shown in FIG. 7.

After the width of the gap has been accumulated as a pixel count it is transferred to the computer 62 as data which can be retained in local memory. It can be then passed on to a host computer (not shown), printed, displayed on CRT 64 as gap widths on a per slot basis, gap widths in a given range or deviation with correlation to the respective slots, and/or a graphic display and instructions for mold correction.

The computer assembly 62 in addition to receipt of data from the camera interface and logic 63 also actuates that hardware in response to both programmed commands from within the computer and signals translated by the computer from the operator's panel. It also controls the position reference generator 61 and responds to the position reference generator in identifying slots by position with the gap gauging for the respective slots from the camera interface and logic 63.

The operator's panel, as shown in FIG. 9, includes switches for starting and stopping the system, actuating the coupling to the host computer, actuating the several modes of CRT display, data manipulation, and data printing, calibrating the system and issuing tare or offset signals of gap height.

Upon turn on of the system by actuation of switch 70 and after the computer assembly has run its initialization program, the computer will execute its two main tasks, monitoring the operator's panel and reading the data, printing results and communicating with the plant computer. In the operator's panel monitoring task, event flags are set to indicate to other tasks which, if any, manual controls have been operated. This task runs at low priority. The other task runs at high priority and is the task that reads in the data, prints results, and communicates with the plant computer. At start up, the second task is initialized to condition the system for further use.

An initial function is to calibrate the gaps between the knife edges 29 and a standard in each of the slots 16. This enables corrections to be introduced into the computer calculation of gap measurements indicating a deviation from the predetermined contour to be gauged, an out-of-flat measure in the example. One form of calibration is a METAL MASTER CALIBRATION in which a very flat metal master is mounted on the gauging table 10 and gap readings in each of the table slots, eight-four in the example, are read to determine the height of mask edge 29 for each slot and record that height in the computer memory so that any variation from uniform gap height can be attributed to variations in the height of mask edge 29. Subsequent gap height readings can be corrected for these variations to eliminate their effect in the computer by subtracting the entire gap height for each slot obtained in the METAL MASTER CALIBRATION as a tare or offset value whereby a perfectly flat seal edge 28 will provide a zero gap reading at each slot.

Typically the METAL MASTER CALIBRATION routine is activated from a control switch 76 on the operator's panel 67 and entered into the main task. The calibration consists of running the table through a given number of revolutions with the metal master on it, typically four runs. The data from the plurality of runs is summed for each slot and averaged for each slot as by summing the four binary counts of slot height and shifting the bit pattern right two places. This average data is written in the computer memory and is used in subsequent operations of the gauging system to ascertain gap height deviations from the standard knife edge 29 to ware edge 28 height for each slot. These deviations are employed as offset values which are subtracted from gauged values for ware to provide absolute measures of deviation from flat of the ware seal edges 28. A metal master calibration should be run each time the mask 31 knife edge 29 or any of its sections 49 is moved on the table and for each size ware to be gauged. Advantageously a metal master is employed for each size of ware and each metal master calibration routine is conducted by actuation of a size of master input on number switch pad 84, a METAL MASTER CALIBRATION switch 76 and a RUN control 65. Any prior calibration data for the size of ware is eliminated from memory and is replaced by the new data as the METAL MASTER CALIBRATION routine is completed.

A primary criterion of the performance of this gauging system is its stability. Stability can be checked by periodically running a piece of ware whose edge deviations from flat have been recorded. In an in line application where ware is passed through the gauging system routinely in the production process, it would be undesirable to expose the metal masters to potential damage during such routine checks. Glass masters, which need not be as precisely flat as metal masters, can be employed to check system stability at intervals such as once a shift. Advantageously, several glass masters are utilized for each size of ware. The glass masters are calibrated following each metal master calibration and the glass master checks are run against their respective calibrations as retained in the system memory. A GLASS MASTER CALIBRATION routine is established by activating a GLASS MASTER CALIBRATION switch 77, entering the identification of the glass meter to be calibrated on number switch pad 84, running the system to measure and to calculate the data for each slot by subtracting the offset data obtained in the metal master calibration, scaling the result so that direct reading of deviation at each slot is obtained and outputting the result. Glass master results can be displayed on the CRT 64 and a printer, usually associated with the plant computer (not shown), and are stored in memory.

System stability can be monitored by checking a calibrated glass master. This is done by entering a GLASS MASTER CHECK mode by actuating switch 78 and the number of the glass master being checked on number switch pad 84, running the system to measure and calculate the data for each slot, scaling that data and then calculating the slot by slot difference between the check data and the data taken on the calibration. In one arrangement the routine can print the calibration and check data sets and the differences. Ideally zero values will result as the differences in the GLASS MASTER CHECK mode indicating no drift in the system, no change in the position of the glass part and no change in the equipment such as that caused by debris on the seal edge, on the support surfaces of the table, or in the measurement slots.

Gauged ware can be graded in this system by setting tolerances with respect to out-of-flat measurements. Tolerance changes can be restricted by requiring the entry of an enabling security code through the number switch pad 84. Threshold values for a plurality of levels can be set for all slots at like levels by a common set mode, tolerance method A actuated by switch 81. Threshold values can be shifted selectively for given slots by an individual reset mode, tolerance method B actuated by switch 82. Threshold values can be set individually for each of a plurality of levels for each slot by tolerance method C actuated by switch 83. For example, with a first, second and third threshold levels set for each slot, four grades of seal edge flatness can be defined as a D grade if the worst data value for an edge exceeds the third or greatest threshold value, a C grade if the worst data value exceeds the second threshold but does not exceed the third value, a B grade if the worst data value exceeds the first threshold but does not exceed the second value, and an A grade if the worst data value does not exceed the first value. These grades are displayed on the control panel 67 at indicators 96, 97, 98 and 99 respectively.

Tolerance changes are undertaken by actuating a TOLERANCE INPUTTING switch 79, entering a security code at the keyboard, selecting the tolerance setting method at switches 81, 82 or 83, setting the tolerance at the keyboard, and writing the tolerance or tolerances set in memory. The setting of the tolerances in the common set mode is by setting the first threshold at the keyboard and actuating the change for all table slots by enter switch 85, in sequence performing the same functions for the second and third thresholds and writing the data in memory. In the individual reset mode the table slot number is entered at the keyboard, the three threshold levels are entered for the slot and the data is written into memory. For an individually set mode, each of the slots are set individually at their threshold levels and stored in sequence.

In setting tolerances the routine can be programmed to present instructions or questions to the operator and the routine can be exited at any time by actuating an ABORT control 73 to return to the normal RUN routine. Alternatively the routine can receive the slot numbers to be reset from the keyboard or the routine can sequentially advance through the slot sequence in step-by-step fashion.

A tolerance resetting function can be terminated anytime before it is completed by actuating the ABORT switch 73. Upon completion of the inputting of tolerances all entered data is written in non-volatile memory.

Gauging of ware is performed while the system is set in the RUN mode by the actuation of switch 72. Seal edge data is developed in this mode by placing the ware on table 10 and causing the table to revolve by actuation of RUN switch 65. Upon a successful run to collect height data for each slot the computer subtracts the offset data obtained in the metal master calibration and scales that calculated data for output to the CRT display 64, a printer (not shown) and/or the classification indicators 96, 97, 98 or 99. The RUN mode can be exited by actuation of ABORT switch 73. ABORT switch can be used with any operating mode.

Error messages are displayed on operator panel 67. SLOT ERROR at indicator 87 indicates that a different number of slots 16 has been counted in one section of the system than is counted or required by other sections of the computer. DIM LIGHT indicator 91 indicates one or more of the slot images had a peak brightness less than a light level alarm threshold.

POSITION ERROR indicator 88 is lit when the table has not returned to its START position and remains lit until that position is attained. Further, while the table is being centered under control of proximity sensors 60 the POSITION FORWARD or POSITION REVERSE indicators 94 and 95 are actuated. Upon the centering of the table at the START position and the completion of signal manipulations and calculations for a cycle the CYCLE READY indicator 93 is actuated.

While the present invention has been illustrated as apparatus and methods for non-contact measurement of the deviation of a glass cathode ray tube bulb part seal edge from flatness and in that disclosure has employed a circular table 10 which has flat coplanar support surfaces for the seal edge support, means to rotate the table around a central axis normal to the support surfaces, an array of equally spaced sector shaped slots extending from the center with a beam of light as a line source of uniform intensity coincident with that central axis projected along the slots and intercepted by a light mask at the bottom of each slot and by the seal edge of the bulb part resting on the table support surfaces so that the shadows of the mask and seal edge and the intermediate line of light passed has a length which can be measured in succession for each of the slots and thus providing a length indication for each of a plurality of gauging stations along the seal edge in registry with the slots, other arrangements can be utilized. Alternative concepts of this invention can rotate the light source and detector means while maintaining the support and workpiece stationary so that the sector shaped light beam is successively presented to the slots. The relative motion between the workpiece and the light source-detector system can be linear by moving either the workpiece or the source-detector system.

In recapitulation, the optical system employed to measure the transverse dimension of the slot image passed between the mask and the seal edge of the part involves a line source of light of uniform intensity. That source can be derived from a wound filament bulb 101 or other non point source which has a condensing lens 102 focused on a ground glass plate diffuser 103 at the focus of the condensing lens. The light from the diffuser is formed in a narrow band or line by a baffle 104 having a slit aperture 106 all adjacent to the diffuser. The light emanating from the aperture is collimated by a first collimating lens 107 and then convergently focused in the plane of the slit by a cylindrical lens 108 having its axis in that plane. The cylindrical lens 108 is spaced its focal length from mirror 21 located to be centered along the image length generally in the planar table surface and inclined to present the linear bar of light at the axis of rotation of the table and perpendicular to the table support surfaces. Thus the light beam diverges from mirror 21 along an optical path to fill the sector slots 16 in the table surface with a uniform light intensity. This divergent light is passed between the mask and workpiece edge and its transverse dimension, its height normal to the support surface, is measured. Since the workpiece edge for rectangular tube parts is at a substantial range of spacings from the detector, for the several gauging stations or slots along the part edge, the system is arranged to accommodate a wide range of seal edge and mask to detector spacing.

The optical system provides this accommodation by virtue of a converging input lens 116, a baffle or aperture plate 118 having a slit 117 transverse to the direction of measurement at the back focal plane of lens 116 and a lens 119 spaced its focal distance from the slit of the baffle. The slit width is adjustable to optimize the waveform signal and system stability. Collimated light is directed to the system from lens 113 which is cylindrical and spaced its focal length from the mirror 21 to recollimate the divergent line rays in the dimension perpendicular to the measurement direction prior to their passage to lens 116. Thus the divergent rays are made parallel in the planes of divergence and are reflected downward by mirror 24. The quasi-telecentric slit is aligned with those rays so that only parallel or nearly parallel light rays pass the system and a large depth of field of the rectangular edges of the mask edge and seal edge at the bottom and top of the slot is provided by the half intensity threshold.

The parallel light from the quasi-telecentric system is focused on the linear array of pixels in the linescan camera so that the shadows of the edges defining the height of the slot are directed to the sensors over the entire width of the slot as it traverses the input pupil of the system by a cylindrical lens 121 having positive power in the plane of slot motion. Thus, the axis of the cylindrical lens 121 is parallel to the line image and the linear array of sensing means in the camera and lens 121 is spaced its focal length from that linear array of sensors. The shadows at the end of the incident light on the array are blurred at their edges and as a result have sloped leading and trailing edges which are essentially symmetrical if the seal edge 28 and mask 29 are equidistant from the detector and are asymmetric when at different distances as illustrated in FIG. 5 where mask 29 is closer to the detector than seal edge 28. The variations in slope of the leading and trailing edges for asymmetric edge shadows are skewed around the half intensity value, within the tolerance of the system, so that the half intensity threshold remains valid for the true distance between the edges for a beam having a uniform light intensity. Thus, where the detector or pixels are discrete aligned sensors, the count of those sensors having a signal indicating that they are irradiated by at least the half peak intensity is a function of the true transverse dimension of the beam passed between mask 29 and seal edge 28. Such a measurement is accomplished by a scan of the linear array of sensors to ascertain the average peak or maximum signal level, a derivation of the signal threshold representing half of the average peak or maximum light intensity and a sensing in a scan of the linear array of sensors of the distance between those half levels from the quasi-telecentric system indicated by the sensors to have light intensity at least one-half the average peak or maximum intensity. In these measurements it is to be appreciated that the individual sensors between those sensing the leading and trailing ramp like signals shall be at a uniform level although some variation may be present due to optical and/or electrical effects and the peak or maximum values as used herein therefore may be, in the spirit of this invention, the average values of the nearly flat region between those ramp portions of the signal.

Electrical means enable the scanned sensors in response to a slot detector 67, which renders the continuously scanned array effective as the optical system is brought into coincidence with slot 16 forming a measuring station, for each of the eighty-four measuring stations in the illustrative system. The electrical system can also scale the pixels or detector elements in the linear array to length measurements so that a sum or count of such elements represents a length of the transverse dimension to be measured as a direct reading on a display such as CRT 64. Electrical signal storage means are provided for length values in the system as a standard gap dimension for each slot, a stability test of gap dimension for each slot and a deviation tolerance of gap dimension for one or more edge quality classifications for workpieces being gauged. Such storage means can be set by programmed controls as the METAL MASTER ROUTINE for the standard gap dimension and the offsets for each slot employed to ascertain out of flat values, or the GLASS MASTER ROUTINE for system stability checks. TOLERANCE INPUTS can be made manually as from keypad 84. Thus electrical signal storage means store a length value, as for a slot offset value, and the system has means to ascertain the difference between a signal length generated by the threshold constrained linescan and the offset value as a deviation in the transverse dimension of the image from the predetermined value represented by the stored signal value. Similarly a difference value can be measured to ascertain system drift in the GLASS MASTER CHECK ROUTINE or to classify workpieces by comparison to the TOLERANCE INPUT values.

Where several classifications of gauged workpieces are provided, the electrical system includes means for comparing a signal length of a signal derived from the electro-optical means with a value set in the storage means by keypad 84, classification means such as lamps 96, 97, 98 and 99 and means to activate the classification means in response to a given relationship between the electro-optical derived signal and the set value in the storage means.

Individual station identification is provided by the identification of each slot by the count of slots in camera and interface logic 63 responding to slot detector 55. Thus the slot detector 55 functions as a pulse generator coupled to the moving table and issuing a pulse for each increment of motion of the table. Such pulses are counted in the camera and interface logic 63 and stored in a first memory which is responsive to the alignment of the measuring stations, slot 16, with the optical path of the image and retains the count identifying the station. A second memory is correlated with the first memory to retain the transverse dimension measurement for the station.

While the system employs a stationary optical image path and moves the workpiece to be gauged through the path, the apparatus and method lends itself to several modifications utilizing the quasi-telecentric imaging of the gauged region, the line image generation, the output image focus on a detector as it is moved through a range of motion, the counting means for image measurement, and the electrical signal manipulation of image measurement and measurement station identification are all applicable to alternatives. For example, the optical system could be rotated while the workpiece and its support is maintained stationary provided the mounting and motion means had sufficient precision to maintain planar motion. Further linear or other motion between the optical system and the workpiece support system could be provided with the gauging optics and signal manipulation for either planar or non-planar edges and motions. Accordingly the preceding description is presented as illustrative of the invention and is not to be read in a restrictive sense.

What is claimed is:

1. Apparatus for measuring the separation of spaced elements across an optical axis comprising:
    a source of uniform light;
    a light detector;
    means collimating light from said source along said optical axis;
    a first lens centered on said optical axis to receive light from said means collimating light passed between said spaced elements;
    a baffle at the back focal plane of said first lens having an aperture centered on the optical axis to limit the angular content of light from said source passed between said spaced elements to rays nearly parallel to the optical axis;
    a second lens focusing the light incident on said first lens and passed by said aperture onto said detector;
    said detector detecting the intensity and position of light in image portions incident thereon from said second lens;
    said aperture having a width along the measurement direction to produce an image incident on said detector having a generally uniform maximum light intensity region between ramped light intensity terminal regions; and
    means to sense the dimension of the image of the light passed between spaced elements and incident on said detector which has an intensity at least one-half the maximum light intensity.

2. Apparatus according to claim 1 wherein said detector is a photoelectric detector and said means to sense is an electrical signal sensing means.

3. Apparatus according to claim 2 wherein said detector is a linear array of equal sized and equally spaced photoelectric cells and said sensing means senses the number of cells issuing an electrical signal which represents an incident light intensity at least one-half the maximum incident light intensity on said array.

4. Apparatus according to claim 1 wherein said source of uniform light is a straight, narrow band in the plane of separation measurement between said spaced elements including said optical axis.

5. Apparatus according to claim 4 including an anamorphic system comprising:
    a first cylindrical lens having an axis in the plane of separation measurement to diverge the light from said collimating means in the planes normal to the separation measurement prior to the passage of the light between said spaced elements; and a second cylindrical lens having an axis in the plane of separation measurement to collimate for said first lens the light divergent in planes normal to the separation measurement and passed between said spaced elements.

6. Apparatus according to claim 1 wherein said light detector is a linear array of photoelectric cells aligned with the separation measurement and normal to said optical axis; and including a cylindrical lens on said optical axis having an axis aligned with the separation measurement focusing light from said second lens on said linear array of photoelectric cells.

7. Apparatus according to claim 4 wherein the means to generate said straight narrow band comprises a light source, a condensing lens for light from said source, a diffuser at the focus of said condensing lens, and a baffle having a slit aperture adjacent said diffuser oriented to develop a line of diffuse light extending in the plane of separation measure.

8. Apparatus according to claim 7 wherein the means for collimating light from said source is a collimating lens centered on the optical axis between said baffle and said spaced elements.

9. Apparatus according to claim 1 wherein said aperture is a slit normal to the plane of separation measurement define by the optical axis and the line of separation of the spaced elements.

10. Apparatus according to claim 9 wherein said slit width is adjustable.

11. Apparatus according to claim 3 including means to scan said linear array repetitively;

means to ascertain a maximum incident light intensity electrical signal value in a first scan of said linear array;

means to set a half intensity electrical signal level of incident light as a lower limit threshold signal level; and means to ascertain during a second scan the length along said array at which at least said threshold signal level is present.

12. Apparatus according to claim 11 including: means to issue an electrical signal corresponding to said length ascertained by said means to ascertain length.

13. Apparatus according to claim 11 including means to scale the length along said array to the separation of the spaced elements.

14. Apparatus according to claim 13 including means to display said scaled length in units of length.

15. Apparatus according to claim 11 wherein said means to ascertain length is a means to count the number of photoelectric cells issuing signals at which at least said threshold signal level is present.

16. Apparatus according to claim 12 including electrical signal storage means for storing a length value signal, and means to ascertain the difference between a signal issued by said means to issue an electrical signal and said stored signal as a deviation in said transverse dimension of said image from a predetermine value represented by said stored signal value.

17. Apparatus according to claim 12 including signal storage means for storing a length value signal; means to set said storage means to selected length signal values; means for comparing a signal issued by said means to issue an electrical signal corresponding to length with a signal in said storage means; classification means for said measured separation of elements; and means to actuate said classification means in response to a given relationship between the value of said electrical signal corresponding to length and said value in said storage means.

18. Apparatus according to claim 17 including a plurality of signal storage means for storing length signal values; manual means to set individual signal storage means to selected length signal values; means for comparing a signaled length signal derived from said means to issue an electrical signal corresponding to length with said signal values set in said signal storage means; a plurality of classification means for said measured separation of elements; and means to actuate given classification means in said plurality in response to given relationships between the value of said signal from said means to issue an electrical signal corresponding to length and said selected values in said plurality of signal storage means.

19. Apparatus according to claim 1 including a plurality of measuring stations for measuring separation of said elements; and means to identify the station currently subject to measurement.

20. Apparatus according to claim 19 including means to move said spaced elements and the combination of said detector, said means for collimating, said first and second lenses and said baffle with respect to each other; means to enable said detector to sense the maximum light intensity along the separation of spaced element when said spaced elements and said combination are positioned at a measuring station subject to measurement; means to ascertain the length of the image incident on the detector which is at least one-half the maximum intensity when said spaced elements and said combination are positioned at a measuring station subject to measurement; and means to enable said length ascertaining means when said spaced elements and said combination are positioned at a measuring station subject to measurement.

21. Apparatus according to claim 20 wherein said detector is a linescan camera having a line array of pixels, said image extending along said line array; means to scan said pixels to sense a signal proportional to the incident light intensity on each pixel; means to enable said pixel signals when said image at a measuring station is subject to measurement; means responsive to a first linescan of said pixels when enabled to establish a signal amplitude proportional to maximum incident light intensity; means responsive to a linescan of said pixels subsequent to said first linescan to establish a signal length comprising those pixels subject to incident light intensity at least one-half maximum incident light intensity.

22. Apparatus according to claim 21 including a sample and hold circuit for the signal amplitude proportional to maximum incident light intensity; and a threshold signal generator responsive to said sample and hold circuit to establish a signal proportional to the pixel signal representing one-half said maximum incident light intensity thereon.

23. Apparatus according to claim 20 including memory means for storing an image length ascertained by said means to ascertain length for each measuring station; and memory means for storing a station identification from said means to identify the station correlated with said stored image length for each station.

24. Apparatus according to claim 1 including means for supporting an edge portion of a workpiece on one side of the optical axis between said means for collimating and said first lens; a light mask having a reference edge; means to position said mask with said reference edge in a predetermined fixed relationship to said mounting means and on the side of the optical axis opposite said one side between said means for collimating and said first lens, said edge of said workpiece and said reference edge being said spaced elements and defining the dimension of said image.

25. Apparatus according to claim 24 including a plurality of measuring stations for measuring the separation of said spaced elements along said means for supporting an edge portion of a workpiece; and means to identify the station currently subject to measurement.

26. Apparatus according to claim 25 including means to impart relative movement between said means for supporting and the optical axis between said means for collimating and said first lens to align said measuring stations with said optical axis.

27. Apparatus according to claim 25 wherein said means to identify the station currently subject to measurement includes a counting means; a pulse generator coupled to said means to impart relative movement and issuing a pulse to said counting means for each increment of imparted movement; a first memory means responsive to the alignment of a measuring station with the optical axis for retaining said count for said station; and a second memory means correlated with said first memory means for retaining the dimension measured for said station.

28. Apparatus according to claim 26 wherein said motion imparting means imparts relative rotational motion.

29. Apparatus according to claim 24 wherein said source of light and said collimating means are stationary and said supporting means is rotatable.

30. Apparatus according to claim 29 wherein said supporting means is a rotatable table having surface for supporting the edge portion of a workpiece and having an open central portion; mounting means for said source of light in said open central portion of said table; said table having a plurality of sector slots extending from said open central portion in its surfaces for supporting which define said measuring stations; means to direct the optical axis and light of uniform intensity from said source of light along said surface for supporting and through said slots; said mask being secured to said table with said reference edge occluding said image in the bottom portion of said slots whereby the transverse dimension of said image is defined between said reference edge and the edge of the workpiece bridging said slots; and means to rotate said table around a rotational axis normal to said surface for supporting to pass said slots through the optical axis between said collimating means and said first lens.

31. Apparatus according to claim 30 wherein said surface for supporting is a plane and said mask reference edge is generally in a plane parallel to said surface for supporting.

32. Apparatus according to claim 30 including an anamorphic system comprising:
means to diverge the light from said means collimating light in planes normal to the measured direction of separation of said workpiece and said mask while maintaining collimation of light in planes parallel to the measured direction of separation of said workpiece and said mask whereby said slots are filled with light of uniform intensity as they are advanced through the optical axis; and
means to recollimate the light passed by said spaced workpiece and mask prior to said first lens, said recollimation being in planes normal to the measured direction of separation of said workpiece and said mask while maintaining collimation of light passed by said spaced workpiece and mask in planes parallel to the measured direction of separation of said workpiece and said mask.

33. Apparatus according to claim 32 wherein said means to diverge light is a cylindrical lens having an axis in the plane of measurement defined by the optical axis and the measured direction of separation of said workpiece and said mask; and wherein said means to recollimate light is a cylindrical lens having an axis in the plane of measurement.

34. Apparatus according to claim 30 wherein said source of light includes a baffle having a slit centered on the plane of measurement defined by the optical axis and the measured direction of separation of said workpiece and said mask and positioned between said source and said means collimating light whereby a bond of light having its longitudinal axis in the plane of measurement is passed by said slit.

35. Apparatus according to claim 34 wherein said source, baffle and means for collimating are aligned on said optical axis which is coincident with said rotational axis of said table; and including means to rotate said optical axis and the plane of measurement into said surface for supporting to be passed by said slots.

36. Apparatus according to claim 30 including a slot detector for identifying the slot which is passed through the axis as said table is rotated.

37. Apparatus according to claim 31 including means to present a narrow straight band of uniform light intensity having its planes perpendicular to and projected parallel to said table surface plane from the open central portion of said table.

38. Apparatus according to claim 37 wherein the means to present the straight band of uniform light intensity is a reflector to rotate the light; and wherein said light source includes a baffle having a slit to pass a band of light, collimating means for light from said slit and a cylindrical lens between said collimating means and said reflector at a focal length from said reflector to form a convergent image of said band which is divergent from said reflector along a slot sector in optical planes parallel to said table upper surface plane.

39. Apparatus according to claim 38 including a second cylindrical lens beyond the perimeter of said table at a focal length from said reflector to collimate the divergent image from said reflector to said first lens in optical planes parallel to said table upper surface plane.

40. Apparatus according to claim 30 including a light mask beyond the perimeter of said table having an aperture to pass light to said collimating means from no more than one sector slot at any given instant.

41. Apparatus according to claim 39 wherein the electro-optical means is a linear array linescan camera having its linear array aligned with the light band image from said first lens.

42. Apparatus according to claim 41 including a cylindrical lens between said second lens and said electro-optical means said cylindrical lens being at its focal length from said electro-optical means and having its axis parallel to the length of the light band.

43. Apparatus for measuring the deviation from flatness of an edge of a workpiece wall which is closed upon itself comprising a circular mounting table having a planar surface to receive the workpiece edge; means mounting said table for rotation around an axis of rotation normal to said surface; said table having an open center portion including said axis of rotation and a series of evenly spaced slots in said table planar surface extending radially from said axis of rotation as sectors of said table with slot walls diverging radially outward; a light mask around the circumference of the circular table and extending above the planar surface thereof, said light mask having a plurality of notches in its upper edge, said notches being aligned with the slots in said table and of a width of the radial extension of the slot sectors; a line source of light of uniform light intensity on said axis of rotation; a first collimating lens for collimating light from said source along an optical axis; a cylindrical lens having its axis on the optical axis to focus the collimated light from said collimating lens as a line of light along the optical axis; a front surface mirror at a focal length of said cylindrical lens from such lens oriented to direct the line of light as a divergent beam of light in planes parallel to the planar surface of said table and having a rectangular cross section filling a slot sector and region above said slot sector and table planar surface; a second cylindrical lens having its axis on the optical axis and positioned outside of said light mask to recollimate the light from a table slot and the portion of the rectangular light beam above the slot; a detector on said optical axis; a first detector lens on the optical axis to receive the recollimated light; a baffle at the back focal plane of said first detector lens having a slit centered on the optical axis and transverse of the major axis of the beam of light to limit the angular content of light from said second cylindrical lens to rays nearly parallel to the optical axis; a second detector lens focusing the light incident on said first detector lens onto said detector; and a detector cylindrical lens having its axis on the optical axis between said second detector lens and said detector and having its axis transverse of the image of the slot depth; means to set a half maximum value of light intensity on said detector; and means to measure the length of the image on said detector of at least said half maximum value of light intensity.

44. Apparatus according to claim 43 wherein said detector is an electro-optical camera; a linear array of pixels in said camera at the focus of said cylindrical lens and aligned with the image of the slot depth; and including means to drive said table in rotation around its axis normal to said surface; a rotational position encoder for said table; a reference position generator responsive to said encoder; a tachometer for said table responsive to table rotational velocity; a motor loop controller for said means to drive said table responsive to said reference position generator and said tachometer to rotate said table according to a pattern signal; a slot detector responsive to the presence of a notch in said circumferential mask and located in phased relationship to a slot entry into the optical path from said mirror to said second cylindrical lens; means repetitively scanning said pixels to detect light incident thereon; wherein said means to set a half maximum value of light intensity includes means to ascertain a maximum value of an initial sampling of the signal from scanning said pixels, and means to set a half value signal level of said maximum value of the initial sampling as a lower limit threshold signal level; wherein said means to measure includes means to ascertain the number of said pixels which have an incident light intensity above said lower limit threshold; means to enable said maximum value ascertaining means, said half value set means, and said signal length ascertaining means in response to said slot detector; and means responsive to said signal length ascertaining means and slot identification from said position reference generator to enable an image length signal for such slot.

45. Apparatus according to claim 44 including means to mask the light image in a slot at a bottom portion of said slot; means to establish a signal length standard for the light image between said bottom of said slot and the planar table surface; and means to store said signal length standard as an offset value for subsequently generated signal lengths.

46. Apparatus according to claim 45 including means to calculate the difference between a measured slot signal length and the offset value.

47. Apparatus according to claim 46 including means to display said slot identification and said difference signal length.

48. The method of measuring a transverse dimension of an image that comprises generating collimated light of uniform intensity; projecting the light between two spaced edges to develop an image having a transverse dimension; passing the image through a first lens limiting the angular content of light of the image passed by the first lens to nearly parallel rays; imaging the light of limited angular content from said first lens at an imaging area; detecting at the imaging area the maximum light intensity in the transverse dimension across the image; setting a threshold value of light intensity at one-half the maximum light intensity across the image; and measuring the length in the transverse dimension of the image portion at the imaging area having light intensities of at least half the detected maximum light intensity to eliminate optical fringe effects at the image of said spaced edges.

49. The method according to claim 48 including mounting a mask to intercept projected light at one side of the transverse dimension of the image; and mounting a workpiece with an edge thereof to intercept projected light at the opposite side of the transverse dimension of the image from said one side whereby said transverse dimension of the image is between the mask and the edge.

50. The method according to claim 49 including forming the collimated light as a straight line of light extending along the transverse dimension and at a position preceding the light intercepting mask and light intercepting workpiece edge.

51. The method according to claim 49 including supporting a portion of the workpiece edge in a fixed relationship to the light intercepting portion of the mask.

52. The method according to claim 51 including imparting relative motion between the projected light and the supported workpiece edge and mask to locate them at each of a plurality of measurement stations; detecting the maximum light intensity in the transverse dimension across the image at the imaging area for each of a plurality of the measurement stations; and measuring the length in the transverse dimension of the image portion at the imaging area for each measurement station having light intensities in excess of half the detected maximum light intensity at the respective measurement stations.

53. The method according to claim 52 wherein the projected light is stationary and the supported workpiece edge and mask are moved generally normal to the projected light while maintaining the workpiece edge and mask relationship.

54. The method according to claim 53 wherein the workpiece edge and mask are closed upon themselves and are rotated with respect to the stationary projected light around an axis of rotation generally normal to the projected light.

55. The method according to claim 52 including the steps of uniquely identifying each measurement station; and correlating the measurement station identity with the measurement for the respective station.

56. The method according to claim 54 wherein the projected light is projected generally from the axis of rotation.

57. The method according to claim 56 including the step of diverging the collimated light in the plane of motion of the workpiece edge and mask to at least the width of a measurement station while maintaining its collimation in planes normal to the plane of motion prior to projecting the light from the axis of rotation.

58. The method according to claim 57 including isolating each measurement station by masking the projected light to a sector extending from the axis of rotation, focusing the light as a straight line extending along the transverse dimension at the axis of rotation and recollimating the light from a focus at the axis of rotation following the light intercepting mask and light intercepting workpiece edge and proceeding the first lens.

59. The method according to claim 56 including focusing the image of limited angular content as a line at a linear detector for a plurality of positions of a measurement station moved through the projected light.

60. The method of measuring the deviation from a flat plane of the edge of a workpiece which is closed upon itself and is of a non-circular configuration which comprises:
mounting the workpiece on a support having a flat plane workpiece edge support surface having an open portion internal of the region adapted to support the edge and having a plurality of radial slots in the surface extending from the open portion;
forming a line source of light perpendicular to the flat plane surface within the open portion of the support;
projecting the light in a sector toward the edge of the workpiece and along the radial slots in the support;
occluding the light in the lower portion of the slots with a reference edge having a predetermined spatial relationship to the flat plane surface;
detecting the length of the light passed in each of a plurality of slots between the reference edge and the workpiece edge;
translating the detected length of light to a signal indicative of the deviation of the workpiece edge from a flat plane at each of the plurality of slots.

61. The method according to claim 60 including imparting relative rotational motion between the projected light and the support and support mounted workpiece on an axis normal to the workpiece support surface to cause the light to scan a plurality of the slots in the support.

62. The method according to claim 61 including maintaining the light source stationary and rotating the support and support mounted workpiece around an axis normal to the plane of workpiece support surface.

63. The method according to claim 60 including mounting the workpiece on the workpiece support surface in a predetermined orientation; and uniquely identifying each of the slots with the length detection therefor whereby the location along the workpiece edge of each indicated deviation from a flat plane is established.

64. The method according to claim 61 including condensing light from a source onto a slit having an image normal to the plane workpiece support surface; collimating the slit image; divergently refracting the slit image only in the dimension parallel to the plane workpiece support surface; and passing the refracted slit image along a slot.

65. The method according to claim 64 wherein the refracted slit image is projected normal to the plane of the support surface located at the radial center of the slot and is convergently focused on a mirror inclined forty-five degrees to the plane of the support surface and to the projected optic axis whereby the slit image is divergent along the slot.

66. The method according to claim 65 including convergently refracting the image emanating from the slot only in the plane parallel to the plane workpiece support to a collimated beam, the focus of the refraction being at the slit image at the radial center of the slots whereby the slit image is projected as collimated light.

67. The method according to claim 66 including limiting the collimated light passed to a reading station to essentially only light parallel to the optic axis of the system and reading the length of that portion of the passed light image which is of an intensity of at least one-half the maximum intensity along the length of the image.

68. The method according to claim 67 including concentrating the image for reading for a range of locations of a slot in the plane of the table and spaced on either side of alignment with the optic system by passing it through a cylindrical lens having positive power only in the plane of motion of the image and focused on the reading means.

69. The method according to claim 61 including imaging the length of the light passed in each of a plurality of slots between the reference edge and the workpiece edge onto a linescan detector.

70. The method according to claim 69 including ascertaining the maximum light intensity passed to the linescan detector and setting a detection threshold at the half maximum light intensity level ascertained.

71. The method according to claim 61 including detecting the length of the image passed in each of a plurality of slots between the reference edge and the workpiece edge by a linescan process of discrete pixels which are subject to at least half the maximum light intensity and translating the count of pixels having at least half the maximum light intensity to the gap length between the reference edge and the workpiece edge for each of a plurality of slots.

* * * * *